United States Patent Office 3,295,319
Patented Jan. 3, 1967

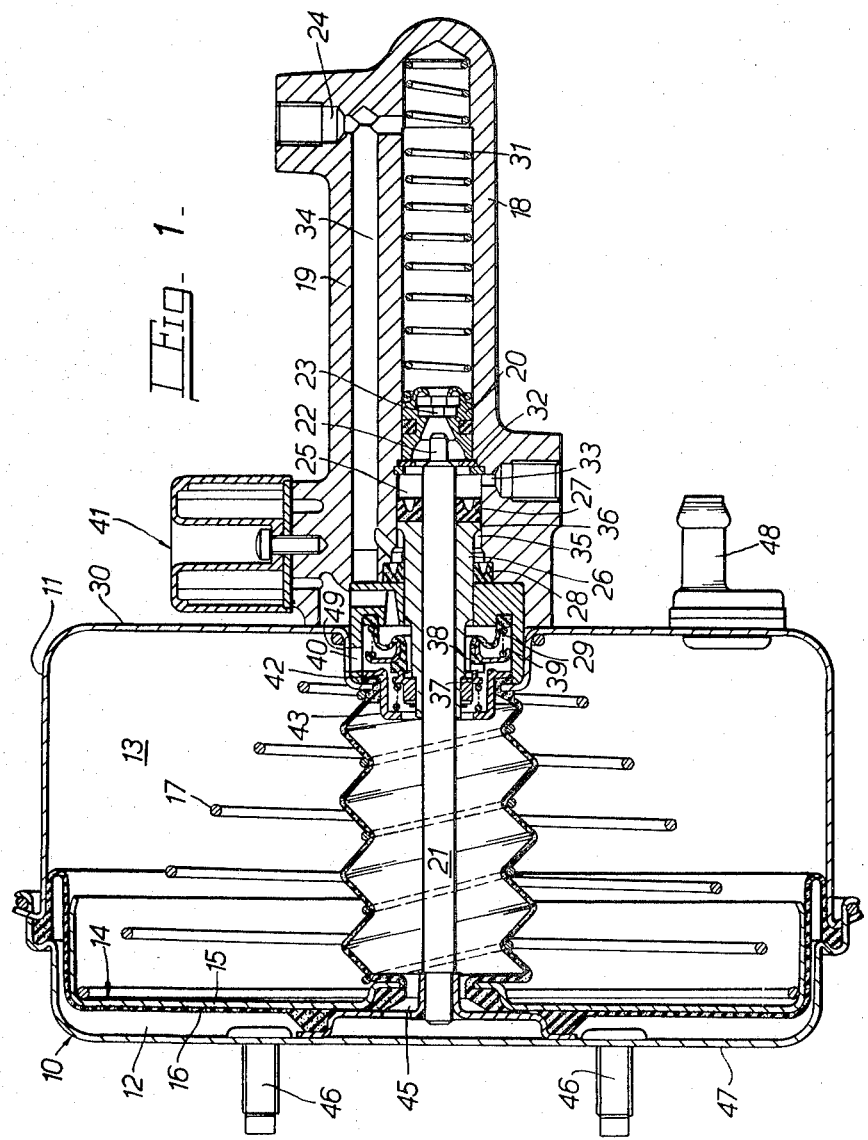

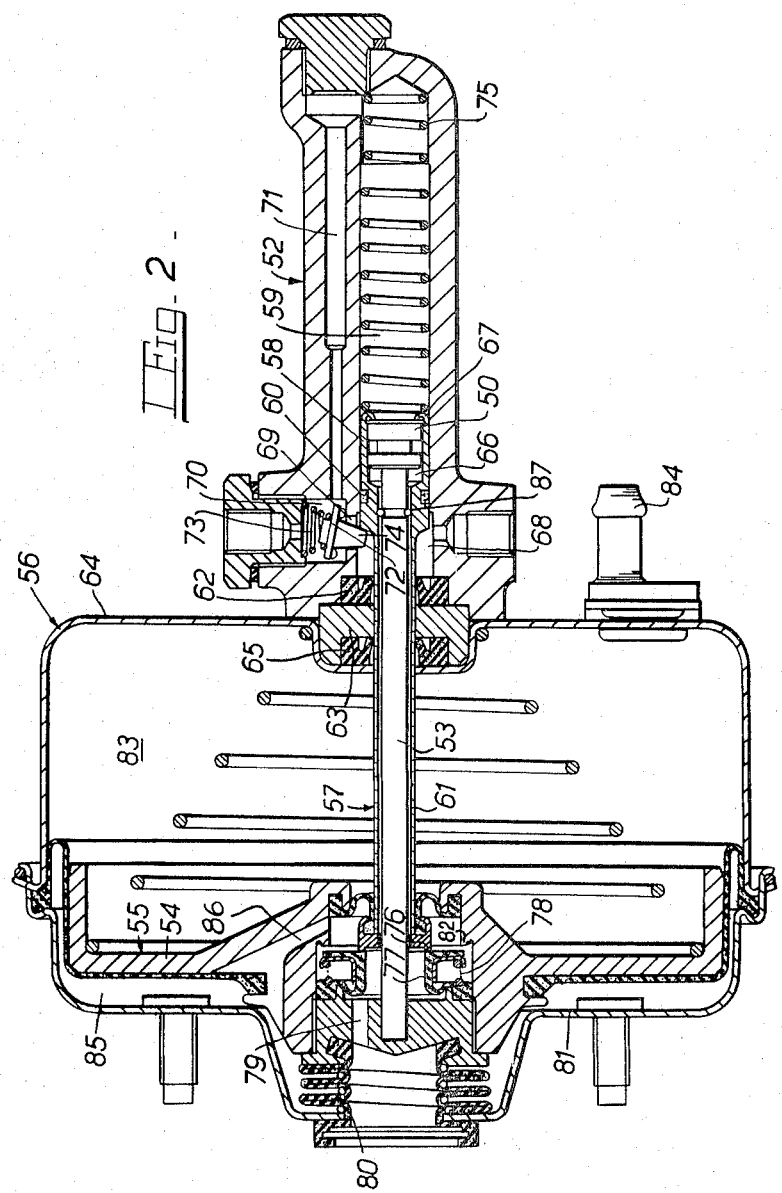

3,295,319
COMBINED BOOSTER AND AUXILIARY MASTER CYLINDER UNITS
Harold Fineman, Edgbaston, Birmingham, England, assignor to Girling Limited, Birmingham, England, a British company
Filed Feb. 8, 1965, Ser. No. 430,891
Claims priority, application Great Britain, Feb. 8, 1964, 5,378/64
11 Claims. (Cl. 60—54.5)

This invention relates to improvements in combined booster and auxiliary master cylinder units for use in hydraulic braking systems of the kind in which energization of the booster is controlled by a pressure-actuated valve in accordance with the pressure generated by manually operable means, such as a master cylinder, and the output pressure produced by the booster in an auxiliary master cylinder adapted to be connected to the brakes.

According to one feature of our invention, control of the booster in a combined booster and auxiliary master cylinder unit of the kind set forth is effected by axial movement of a sleeve of stepped diameter fitting over a rod by which the booster actuates the piston in the auxiliary master cylinder, one end of the sleeve and the portion of the sleeve at the step is diameter defining surfaces of different areas of which one surface is exposed to the pressure generated in a pedal-operated master cylinder and the other surface is exposed to the outlet pressure produced in the auxiliary master cylinder by the booster.

According to a further feature of our invention valve mechanism for controlling the energization of the booster in a combined booster and auxiliary master cylinder unit of the kind set forth is located around the axially movable rod by which the booster actuates the piston in the auxiliary master cylinder and communicates with the end of the booster remote from the auxiliary master cylinder through a flexible bellows or equivalent means connected to the movable wall of the booster so that the usual external connection to the chamber in the booster behind the movable wall can be eliminated.

Two practical forms of combined booster and auxiliary master cylinder unit in accordance with our invention are illustrated by way of example in the accompanying drawings, in which:

FIGURE 1 is a longitudinal section of one form of combined booster and auxiliary master cylinder unit; and FIGURE 2 is a longitudinal section of another form of combined booster and auxiliary master cylinder unit.

In the unit shown in FIGURE 1, 10 is a booster of the vacuum suspended type. The housing or cylinder 11 of the booster is divided into front and rear chambers 12 and 13 by a movable wall 14 comprising a piston working in the cylinder or, as illustrated, a piston 15 mounted on a rolling diaphragm 16. When the pressure in the chambers on opposite sides of the movable wall are substantially balanced the wall is urged by a spring 17 into the off position shown.

The auxiliary master cylinder 18 is located in a housing 19 in axial alignment with the booster which housing is rigidly secured to the forward end of the housing of the booster. A piston 20 working in the cylinder is actuated by a rod 21 which is secured at its rear end in the movable wall of the booster and at its forward end has a tapered nose 22 adapted, when the booster is energised, first to close an axial passage 23 in the piston and then to advance the piston to apply pressure to liquid in the cylinder of which the forward end is connected to the slave cylinder of the brakes through an outlet 24.

The rear end of the cylinder is counter-bored at 25, and working in this part is a sleeve 26 of stepped diameter fitting slidably over the booster rod 21. The end of the sleeve of larger diameter is at the forward end and carries or abuts on a cup seal 27 engaging with the cylinder bore and with the booster rod. The rear part of the sleeve, which is of smaller diameter, extends through another seal 28 into a recess in the adjacent end wall 30 of the booster.

The piston 20 working in the auxiliary master cylinder is normally held by a spring 31 against a rear stop formed by a circlip 32 or the like in the cylinder bore, and connection 33 from a pedal-operated master cylinder leads into the cylinder bore between the rear end of the piston and the seal 27 at the front end of the stepped sleeve. A longitudinal passage 34 drilled in the housing 19 connects the forward end of the auxiliary cylinder to an annular space 35 in the bore around the part of the sleeve of smaller diameter, that is, behind a shoulder 36 at the step in diameter.

The master cylinder pressure thus acts on an area of the forward end of the sleeve equal to the total area of that end less the cross-sectional area of the booster rod, and the pressure applied to the brakes acts on the area of the shoulder at the step in diameter. The difference in these areas is the booster ratio, i.e. the ratio of output pressure required to input pressure from the master cylinder and will usually be of the order of 2.8 to 1.

The rear end of the sleeve 26 is reduced in diameter and carries the inner annular seat 37 of the control valve for the booster.

A movable valve member 38 is normally held in engagement with this seat by a spring 39 to close off a connection 40 to atmosphere through a filter 41. An annular outer seat 42 is carried by a member 43 fixed to the booster housing and the valve member 38 is normally spaced from this outer seat which is the vacuum valve seat.

The rear end of the recess 29 in the end wall of the booster in which the valve mechanism is housed is open and is connected by axially extending flexible bellows 44 or the like to the piston 15 of the movable wall of the booster. Openings 45 are provided in the piston within the bellows so that the rear chamber 12 of the booster behind the piston is in direct communication with the valve.

The combined booster and auxiliary master cylinder unit is normally housed at a suitable location in the engine compartment of a vehicle and mounted on the vehicle's structure by mounting studs 46 fixed in the rear end wall 47 of the booster housing. Chamber 13 in the booster is normally connected to a source of vacuum, such as the inlet manifold of the vehicle's engine, through a connection 48. In the deenergised or vacuum-suspended condition chamber 12 is also subjected to vacuum by a port 49 leading from chamber 13 into the recess 29 in the booster casing, past the control valve mechanism and through the bellows and the openings in the piston.

When liquid under pressure is delivered from the pedal-operated master cylinder the pressure acting on the forward end of the stepped sleeve 26 moves the sleeve rearwardly and the sleeve takes the inner valve seat 37 with it until the valve member 38 under the action of the spring 39 engages the outer seat 42 and cuts off the connection to vacuum from the chamber 13. Further rearward movement of the sleeve caused by increase in the master cylinder pressure moves the inner seat 37 away from the valve member and air flows through the valve and through the bellows into the rear chamber 12 of the booster to advance the movable wall 14 of the booster.

The booster rod 21 then closes the passage 23 in the piston 20 of the auxiliary master cylinder and advances the piston to apply pressure to the liquid in the front of the piston and so to the brakes. This pressure acts on the stepped sleeve in opposition to the master cylinder pressure and the sleeve moves forwardly until a position of equilibrium is reached. The brakes are maintained applied so long as the pedal-operated master cylinder pressure is maintained and if the pedal-operated master cylinder pressure is increased the braking pressure is increased correspondingly.

Our improved unit in accordance with this embodiment has a number of practical advantages.

One is that there is only one machined bore in the auxiliary master cylinder housing 19.

Another is that there is only one hydraulic to vacuum seal 28 so that the risk of hydraulic fluid being drawn into the engine manifold is reduced and the seal is only under pressure when the brake is applied.

A further advantage is that the usual external pipe connecting the valve to the power chamber 12 of the booster is eliminated.

If a leak should develop in the bellows air can be drawn into the engine manifold but only when the brake is applied.

In the combined booster and auxiliary master cylinder unit shown in FIGURE 2, a piston 50 of the auxiliary master 52 is mounted on the forward end of a rod 53 which is secured at its rear end in the piston 54 of the movable wall 55 of the booster 56. A sleeve 57 is extended rearwardly through the booster over the piston rod and its forward end 58, which is of larger diameter, works in the rear end of the master cylinder bore 59 and is provided with a seal 60. The reduced part 61 of the sleeve extends rearwardly through an annular seal 62 located between the master cylinder and an annular member 63 housed in a recess in the front end wall 64 of the housing of the booster, and through an annular seal 65 located between the member 63 and the end wall 64 of the housing.

The piston 50 which is integral with or secured to the forward end of the booster rod 53 is of a smaller diameter than the forward end of the sleeve and is received in an axial recess 66 in the forward end of the sleeve in which the piston is trapped by an inwardly turned lip or flange 67 at the forward extremity of the sleeve.

The axial length of the recess is greater than that of the piston so that limited relative axial movement between the piston and the sleeve is permitted, the extent of this movement being greater than the movement of the sleeve required to operate a valve controlling operation of the booster.

A pedal-operated master cylinder is connected to an annular space 68 around the sleeve behind the step in diameter, and a port 69 leads out of the same space into a chamber 70 connected to the brakes and also connected by a longitudinal passage 71 in the housing of the auxiliary master cylinder to the forward end of the auxiliary master cylinder. The port is controlled by a tipping valve 72 loaded by a spring 73 and opening towards the chamber. The valve has a stem 74 which projects through the port into the annular space around the sleeve. In the off position the step in the sleeve is held in engagement with the stem by a spring 75 to hold the valve in the tipped open position.

The pedal-operated master cylinder pressure acts on the annular shoulder formed by the step in diameter while the braking pressure produced in the auxiliary master cylinder by the booster acts on the annular forward end of the sleeve around the piston through the longitudinal passage 71 drilled in the housing.

The inner annular seat 76 of the control valve of the booster is carried by the rear end of the sleeve.

A movable valve member 77 is normally held in engagement with this seat by a spring 78 to close of a connection 79 to atmosphere through the piston 54 of the booster and through a bellows 80 connected between the piston and rear end wall 81 of the booster. An annular outer seat 82 is formed on the piston and the valve member is normally spaced from this outer seat which is the vacuum valve seat.

When liquid under pressure is supplied to the auxiliary master cylinder from the pedal-operated master cylinder it flows into the annular space 68 around the sleeve and through the open tipping valve 72 to the brakes and to the forward end of the auxiliary master cylinder. As the pressure in the annular space rises the sleeve is moved forwardly, allowing the tipping valve to close, and carrying the inner valve seat 76 with it. The spring 78 holds the valve member 77 in engagement with the valve seat 76 until the valve member engages with the outer valve seat 82. This enagement cuts off the supply of vacuum from a chamber 83 on one side of the movable wall 55 of the booster connected to vacuum through a connection 84 to a chamber 85 on the opposite side of the wall through a passage 86 in the piston.

Further movement of the sleeve caused by increase in the master cylinder pressure moves the inner valve seat 76 away from the valve member and air flows through the valve and through the passage 86 in the piston 54 into the rear chamber 85 of the booster to advance the movable wall 55 of the booster.

The distance that the valve member 77 has to move before it engages with the outer valve seat 82 is greater than the movement of the sleeve required to permit the tipping valve to close. This ensures that the tipping valve closes before air is admitted into the booster thereby eliminating any tendency for the unit to "knock."

Movement of the movable wall of the booster advances the piston 50 to increase the pressure in the auxiliary master cylinder and hence in the brakes, this pressure acting on the tipping valve in a direction to hold it closed and also acting on the annular forward end of the sleeve in opposition to the master cylinder pressure.

The construction and operation of the unit according to this embodiment is otherwise the same as the embodiment described above with reference to FIGURE 1.

When the pedal is released and the pressure of the pedal-operated master cylinder is relieved the piston 50 in the auxiliary master cylinder and the sleeve 61 are returned to their rest positions by the return spring 75 in the auxiliary master cylinder and the tipping valve is opened so that the brake lines and the auxiliary master cylinder are in communication with the pedal-operated master cylinder through the tipping valve.

A seal 87 located in an annular recess in the rod 53 and slidably engaging with the sleeve prevents any liquid passing into the control valve.

The unit in accordance with the embodiment of FIGURE 2 has the advantage that the number of component parts has been reduced. Manufacture of the unit is simple in that there is only one machined bore in the housing of the auxiliary master cylinder 52.

Another advantage is that there are no seals which are subjected on one side to vacuum and on the other side to liquid pressure, the seals 62 and 65 being exposed to pressure exerted by the pedal-operated master cylinder whilst the seal 87 is exposed to pressure exerted by the auxiliary master cylinder.

In a modification the seals 62 and 65 can be replaced by a single seal.

I claim:

1. In a combined booster and auxiliary master cylinder unit for use in a vehicle hydraulic braking system incorporating in combination: a booster including a housing, a wall movable in said housing in response to a pressure difference, a rod connected to and adapted to be actuated by said movable wall, and valve means for controlling the flow of a pressure medium with respect to an end of said housing to cause said pressure difference adapted to be actuated by manually operable means; and an auxiliary master cylinder including a housing, a piston working in a bore of said housing and actuated by said rod of said booster, and outlet means from the cylinder through which fluid under pressure is adapted to be supplied to vehicle brakes, the invention comprising means for controlling operation of said control valve means of said booster, said means including a sleeve of stepped diameter fitting over the rod of said booster, said sleeve having opposite ends of different diameters of which one of said ends and a portion of the sleeve at the step in diameter define surfaces of different areas, one of said surfaces being exposed to pressure generated by said manually operable means, and the other of said surfaces being exposed to outlet fluid pressure produced in the bore of the housing of said auxiliary master cylinder.

2. The invention as claimed in claim 1, wherein the end of the sleeve of larger diameter works in the bore of the housing of said auxiliary master cylinder, and the pressure generated by said manually operable means acts on an area equal to the area of said larger diameter end less the cross-sectional area of said booster rod, the outlet fluid pressure produced in the bore of said auxiliary master cylinder acting on the area of a shoulder on the sleeve at the step in diameter.

3. The invention as claimed in claim 1, wherein a counter-bore is provided at the end of the auxiliary master cylinder adjacent to the booster, and the end of the sleeve of larger diameter works in said counter-bore.

4. The invention as claimed in claim 2, wherein there is an annular space in the bore of the housing of the auxiliary master cylinder around the part of the sleeve of smaller diameter, and the housing of the auxiliary master cylinder is provided with a longitudinal passage connecting the end of the auxiliary master cylinder adjacent to the booster with said annular space, whereby the outlet pressure produced in said auxiliary master cylinder acts on the area of said shoulder at the step in diameter through said longitudinal passage.

5. The invention as claimed in claim 1, wherein the piston of said auxiliary master cylinder is provided with an axial passage normally providing communication between said manually operable means and said outlet means, and said booster rod has at its forward end remote from said movable wall a tapered nose adapted, when the pressure difference is applied to said movable wall, first to close said axial passage and then advance said piston to apply pressure to liquid in said auxiliary master cylinder.

6. The invention as claimed in claim 1, wherein the sleeve at its end of larger diameter abuts on a cap seal engaging with the bore of said auxiliary master cylinder and with said booster rod, and a seal is provided between the booster and the auxiliary master cylinder through which extends a part of the sleeve of smaller diameter.

7. In a combined booster and auxiliary master cylinder unit for use in a vehicle hydraulic braking system incorporating in combination: a booster including a housing, a wall movable in said housing in response to a pressure difference, a rod connected to and adapted to be acuated by said movable wall, and valve means for controlling the flow of a pressure medium with respect to an end of said housing to cause said pressure difference adapted to be actuated by a pedal-operated master cylinder; and an auxiliary master cylinder including a housing, a piston working in a bore of said housing and actuated by said rod of said booster, and outlet means from the cylinder through which fluid under pressure is adapted to be supplied to vehicle brakes, the invention comprising means for controlling operation of said control valve means of said booster, said means including a sleeve of stepped diameter fitting over the rod of said booster, said sleeve having opposite ends of different diameters of which one of said ends and a portion of the sleeve at the step in diameter define surfaces of different areas, and the end of the sleeve of larger diameter works in the bore of said auxiliary master cylinder, pressure generated by said pedal-operated master cylinder acting on a shoulder on the sleeve at the step in diameter, and the outlet pressure generated in said auxiliary master cylinder acting on the area of larger diameter.

8. The invention as claimed in claim 7, wherein said auxiliary master cylinder includes an annular space behind the step in diameter to which the pedal-operated master cylinder is connected, a chamber connected to said outlet means, a port providing communication between said annular space and said chamber, a longitudinal passage providing communication between the bore of the housing of said auxiliary master cylinder and said chamber, and a spring-loaded tipping valve controlling said port and opening towards said chamber.

9. The invention as claimed in claim 8, wherein said tipping valve has a stem projecting through said port into said annular space around said sleeve, the shoulder on said sleeve being engageable in the off position to hold said tipping valve in a tipped open position.

10. The invention as claimed in claim 7, wherein said piston is of smaller diameter than the smaller end of the sleeve, and an axial recess is provided in the forward end of the sleeve in which the piston is received, an inwardly turned lip or flange on the forward extremity of the sleeve trapping the piston in said recess, the axial length of the recess being greater than that of the piston whereby limited relative movement between the piston and the sleeve is permitted.

11. The invention as claimed in claim 7, wherein a seal is provided between the rod and the sleeve, and at least one seal is located between the booster and the auxiliary master cylinder in which the portion of sleeve of smaller diameter is slidably engaged.

References Cited by the Examiner

UNITED STATES PATENTS

| | | | |
|---|---|---|---|
| 2,440,654 | 4/1948 | Elliott | 60—54.5 |
| 2,455,984 | 12/1948 | Elliott | 60—54.5 |
| 2,924,072 | 2/1960 | Burwell | 60—5.54 |

MARTIN P. SCHWADRON, *Primary Examiner.*

ROBERT R. BUNEVICH, *Examiner.*